United States Patent
Nishiyama

(10) Patent No.: US 11,206,673 B2
(45) Date of Patent: Dec. 21, 2021

(54) PRIORITY CONTROL METHOD AND DATA PROCESSING SYSTEM

(71) Applicant: Hitachi, Ltd., Tokyo (JP)

(72) Inventor: Reiji Nishiyama, Tokyo (JP)

(73) Assignee: Hitachi, Ltd., Tokyo (JP)

(*) Notice: Subject to any disclaimer, the term of this patent is extended or adjusted under 35 U.S.C. 154(b) by 450 days.

(21) Appl. No.: 16/332,429

(22) PCT Filed: Dec. 28, 2016

(86) PCT No.: PCT/JP2016/089128
§ 371 (c)(1),
(2) Date: Mar. 12, 2019

(87) PCT Pub. No.: WO2018/123030
PCT Pub. Date: Jul. 5, 2018

(65) Prior Publication Data
US 2021/0298033 A1    Sep. 23, 2021

(51) Int. Cl.
*H04W 72/10* (2009.01)
*H04W 8/18* (2009.01)
(Continued)

(52) U.S. Cl.
CPC ......... *H04W 72/10* (2013.01); *H04W 8/186* (2013.01); *H04W 8/20* (2013.01); *H04W 72/0406* (2013.01)

(58) Field of Classification Search
None
See application file for complete search history.

(56) References Cited

U.S. PATENT DOCUMENTS

2005/0261923 A1    11/2005  Brown et al.
2012/0215873 A1*   8/2012   Beardsmore ............ H04L 12/66
                                                        709/207
(Continued)

FOREIGN PATENT DOCUMENTS

| JP | 2009-20551 A | 1/2009 |
| JP | 2009-278254 A | 11/2009 |
| WO | WO 2008/050409 A1 | 5/2008 |

OTHER PUBLICATIONS

International Search Report (PCT/ISA/210) issued in PCT Application No. PCT/JP2016/089128 dated Mar. 14, 2017 with English translation (three (3) pages).
(Continued)

*Primary Examiner* — Kodzovi Acolatse
*Assistant Examiner* — The Hy Nguyen
(74) *Attorney, Agent, or Firm* — Crowell & Moring LLP

(57) ABSTRACT

A priority control method includes receiving, by the server, the data to be subscribed by the terminal and the default priority of the data, and setting the terminal and the default priority in priority management information in association with each other, setting, by the server, the data issued by the data source and the terminal subscribing the data in subscriber management information in association with each other, transmitting, by the data source, an importance level of the issued data, setting, by the server, the importance level received from the data source in the priority management information in association with the default priority for the terminal subscribing the data; and referring, by the server, to the priority management information to calculate a final priority from the default priority for the terminal and the importance level.

10 Claims, 12 Drawing Sheets

(51) Int. Cl.
*H04W 72/04* (2009.01)
*H04W 8/20* (2009.01)

(56) References Cited

U.S. PATENT DOCUMENTS

| | | | |
|---|---|---|---|
| 2015/0120852 A1* | 4/2015 | Bhat | H04L 51/26 709/207 |
| 2016/0269348 A1* | 9/2016 | Beardsmore | H04L 67/10 |

OTHER PUBLICATIONS

Japanese-language Written Opinion (PCT/ISA/237) issued in PCT Application No. PCT/JP2016/089128 dated Mar. 14, 2017 (four (4) pages).

* cited by examiner

230 SUBSCRIBER MANAGEMENT INFORMATION

| TOPIC (231) | SUBSCRIBER (232) |
|---|---|
| TOPIC 1 | TASK 1, TASK 4 |
| TOPIC 2 | TASK 2 |
| TOPIC 3 | TASK 3 |

*Fig. 7*

320 TASK PRIORITY MANAGEMENT INFORMATION

| TASK (321) | DEFAULT PRIORITY (322) | IMPORTANCE LEVEL (323) | INTEREST LEVEL (324) | FINAL PRIORITY (325) |
|---|---|---|---|---|
| TASK 1 | 3 | 3 | 3 | 9 |
| TASK 2 | 2 | | | 2 |
| TASK 3 | 1 | | | 1 |
| TASK 4 | 3 | 3 | -2 | 4 |

*Fig. 8*

340 DISTRIBUTION DESTINATION MANAGEMENT INFORMATION

| TASK (341) | DISTRIBUTION DESTINATION (342) |
|---|---|
| TASK 1 | MOBILE TERMINAL 1 |
| TASK 2 | MOBILE TERMINAL 2 |
| TASK 3 | MOBILE TERMINAL 3 |
| TASK 4 | MOBILE TERMINAL 4 |

*Fig. 9*

PRIORITY CONTROL METHOD AND DATA PROCESSING SYSTEM

BACKGROUND

This invention relates to an improvement of a publish-subscribe system.

Hitherto, a message hub (hereinafter referred to as "publish-subscribe message hub") that employs a publish-subscribe model allows a publisher to publish (issue) data, and allows an indefinitely large number of subscribers to receive data published by a given publisher (see, for example, US 2005/261923 A1).

In recent years, in the fields of IT and IoT, it has been expected to apply a publish-subscribe message hub to a large-scale data processing system, to thereby accommodate various data sources and analyze data collected from the respective data sources by various methods. This allows a data processing system to be built with high scalability.

SUMMARY

For priority control, there is known a technology in which a sender of data sets a priority to the data. However, there is a problem that, in the publish-subscribe message hub, importance attached to data may vary depending on the subscriber even with the same data, while the related-art technology described above does not allow the subscriber to set an accurate priority. Therefore, the above-mentioned related art may cause a basically important task to be obstructed by processing of another task due to scheduling based on the inaccurate priorities.

Therefore, this invention has been made in view of the above-mentioned problem, and has an object to provide a publish-subscribe system capable of reflecting a priority assumed by a subscriber.

An aspect of this disclosure is a priority control method including a first step of transmitting to the server, by the terminal, a default priority and data to be subscribed; a second step of receiving, by the server, the data to be subscribed by the terminal and the default priority of the data, and setting the terminal and the default priority in priority management information in association with each other, a third step of setting, by the server, the data issued by the data source and the terminal subscribing the data in subscriber management information in association with each other, a fourth step of transmitting, by the data source, an importance level of the issued data, a fifth step of setting, by the server, the importance level received from the data source in the priority management information in association with the default priority for the terminal subscribing the data and a sixth step of referring, by the server, to the priority management information to calculate a final priority from the default priority for the terminal and the importance level.

According to one embodiment of this invention, in addition to an importance level of the data issued by a publisher of data, a default priority of a terminal of a subscriber is reflected in a final priority. Accordingly, it is possible to control distribution of data based on a value of the final priority obtained in consideration of a priority assumed by the publisher of data and the priority assumed by the subscriber.

BRIEF DESCRIPTION OF THE DRAWINGS

FIG. 7 is a table for showing an example of the subscriber management information according to the first embodiment of this invention.

FIG. 8 is a table for showing an example of the task priority management information according to the first embodiment of this invention.

FIG. 9 is a table for showing an example of the distribution destination management information.

DETAILED DESCRIPTION OF THE PREFERRED EMBODIMENTS

Figure 1:
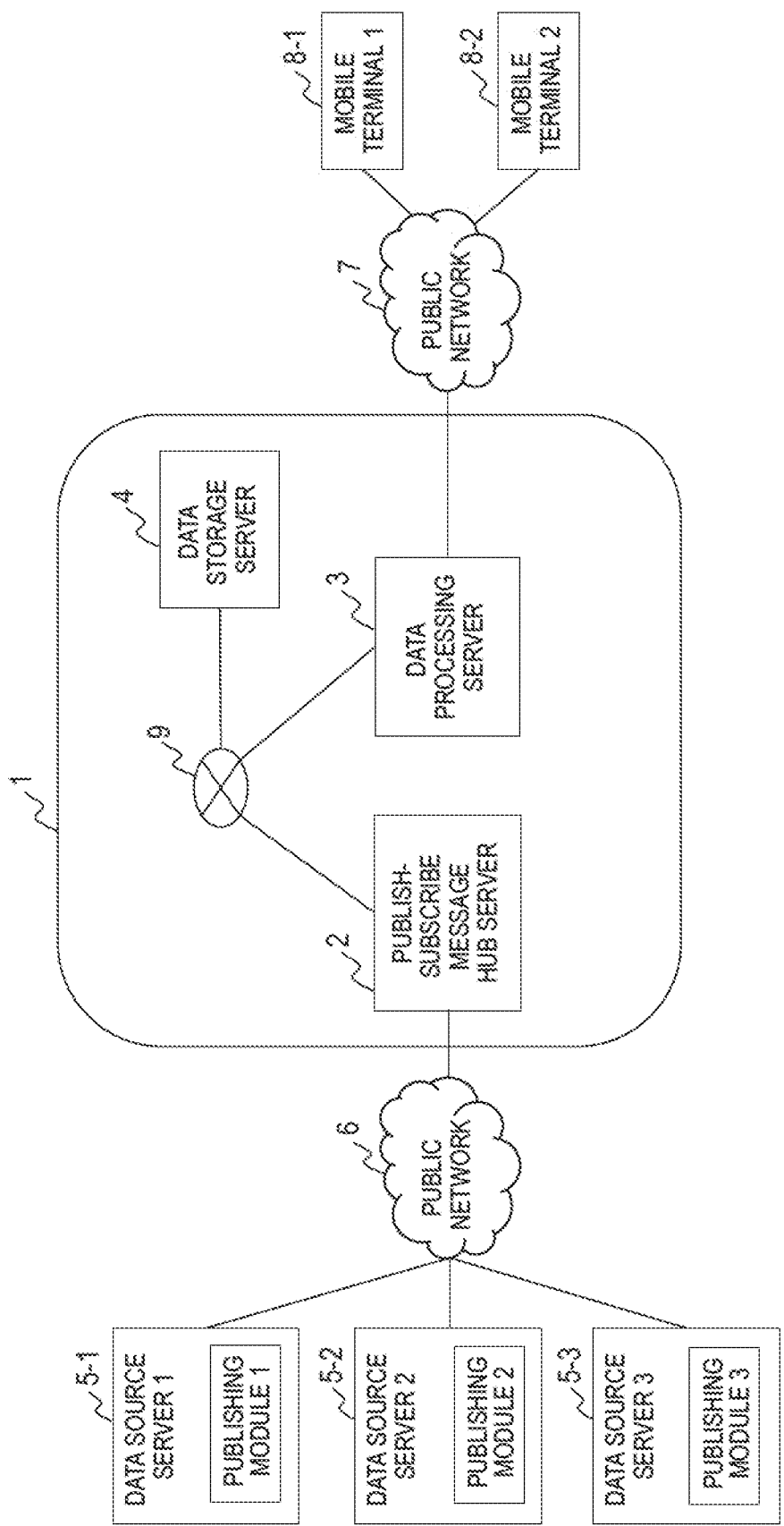
FIG. 1 is a block diagram for illustrating an example of a configuration of a data processing system according to a first embodiment of this invention.

Embodiments of this invention are described below with reference to the accompanying drawings. In the following description, like components are denoted by like reference numerals.

First Embodiment

FIG. 1 is a block diagram for illustrating an example of a configuration of a data processing system according to a first embodiment of this invention. In FIG. 1, a plurality of data source servers 5-1 to 5-3 and a data center 1 including a publish-subscribe message hub server 2 are coupled to each other through a public network 6, and the data center 1 and a plurality of mobile terminals 8-1 and 8-2 are coupled to each other through a public network 7.

The data center 1 includes the publish-subscribe message hub server 2 configured to perform communication to/from the data source servers 5-1 to 5-3 through the public network 6, a data processing server 3 configured to perform communication to/from the plurality of mobile terminals 8-1 and 8-2 through the public network 7, a data storage server 4 configured to store data received from the data processing server 3, and a closed network 9 configured to couple the publish-subscribe message hub server 2, the data processing server 3, and the data storage server 4 to one another.

In the following description, when being collectively referred to, the data source servers 5-1 to 5-3 are denoted simply by reference numeral "5" with the subsequent suffixes preceded by "-" being omitted. The same applies to the reference numerals of the other components.

The data source server 5 is capable of transmitting data to the publish-subscribe message hub server 2. When receiving the data from the data source server 5, the publish-subscribe message hub server 2 distributes the received data to the data processing server 3.

The data in the first embodiment is not limited to publications including electronic books, and includes data collected from sensors and data received from another apparatus. In the first embodiment, the data refers to data issued (published) by each of publishing modules 510-1 to 510-3 included in the data source servers 5-1 to 5-3.

When receiving the data from the publish-subscribe message hub server 2, the data processing server 3 subjects the received data to predetermined processing including format conversion, a numerical operation, and a logical operation, and transmits results of the processing to the data storage server 4 and the mobile terminals 8-1 and 8-2 used by subscribers.

As described above, the data issued by the data source server 5 includes information obtained by the sensors or other such binary information, and hence the predetermined processing performed by the data processing server 3 involves converting or processing the binary information or other such information into information identifiable by the subscriber.

The data storage server 4 stores the data received from the data processing server 3. When receiving the data from the data processing server 3, each of the mobile terminals 8-1 and 8-2 performs screen display or other such processing. The mobile terminals 8-1 and 8-2 can also transmit data collected from sensors or other such apparatus to the data processing server 3.

The first embodiment relates to an example in which one data center 1 includes one publish-subscribe message hub server 2 and one data processing server 3, but a plurality of publish-subscribe message hub servers 2 and a plurality of data processing servers 3 may be arranged. In addition, a plurality of data center 1 may be provided.

<Publish-Subscribe Message Hub>

Figure 2:
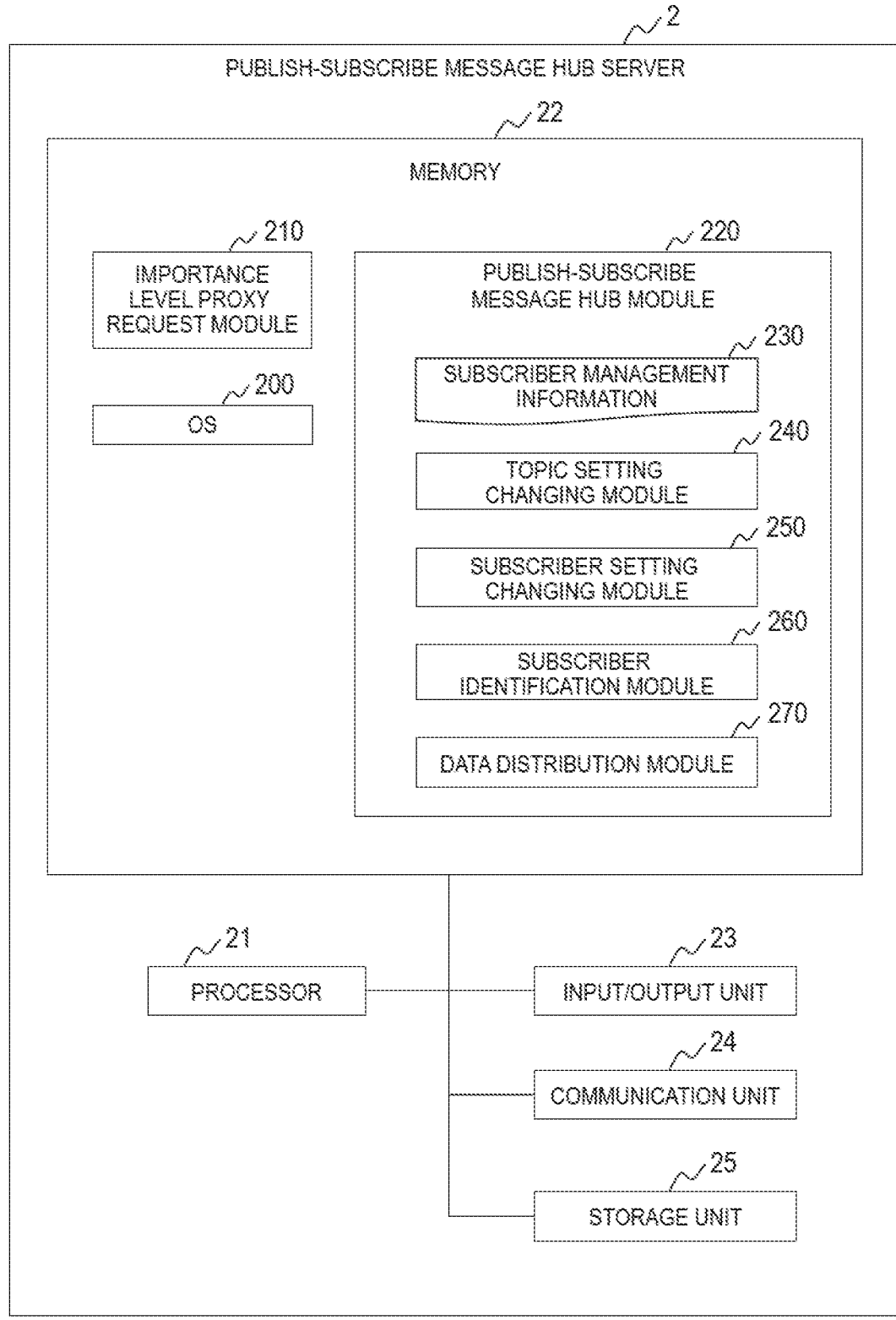
FIG. 2 is a block diagram for illustrating an example of a configuration of the publish-subscribe message hub server according to the first embodiment of this invention.

FIG. 2 is a block diagram for illustrating an example of a configuration of the publish-subscribe message hub server 2. The publish-subscribe message hub server 2 includes a processor 21 configured to execute a program, a nonvolatile storage unit 25 configured to store a program and data, a communication unit 24 configured to perform communication to/from another apparatus, an input/output unit 23 configured to, for example, receive input from an administrator and perform screen display, and a memory 22 configured to temporarily hold data and programs.

An OS 200, an importance level proxy request module 210, and a publish-subscribe message hub module 220 are loaded into the memory 22 to be executed by the processor 21. The importance level proxy request module 210 and the publish-subscribe message hub module 220 are operated on the OS 200.

The processor 21 operates as a functional module configured to provide a predetermined function by performing processing in accordance with a program of each functional module. For example, the processor 21 functions as the importance level proxy request module 210 by performing processing in accordance with an importance level proxy request program. The same applies to other programs. In addition, the processor 21 also operates as a functional module configured to provide each function of a plurality of processing steps executed by each program. A computer and a computer system therefor are an apparatus and a system that include those functional modules.

Information including programs for implementing respective functions of the importance level proxy request module 210 and the publish-subscribe message hub module 220 and tables therefor can be stored in the storage unit 25, a nonvolatile semiconductor memory, a hard disk drive, a solid-state drive (SSD), or other such memory device, or an IC card, an SD card, a DVD, or other such computer-readable non-transitory data storage medium.

The publish-subscribe message hub module 220 includes subscriber management information 230, a topic setting changing module 240, a subscriber identification module 260, a subscriber setting changing module 250, and a data distribution module 270.

FIG. 7 is a table for showing an example of the subscriber management information 230. The subscriber management information 230 includes, for each entry, a topic 231 for storing an identifier of data issued by the data source server 5 and a subscriber 232 for storing an identifier of a task that transmits data (processing result) to the mobile terminal 8 subscribing the topic.

The subscriber management information 230 is information set in advance by, for example, an administrator of the publish-subscribe message hub server 2. By referring to the subscriber management information 230, the publish-subscribe message hub module 220 can determine which task (task for a user application 810 of the mobile terminal 8) on the data processing server 3 is to be used to process the data issued by the data source server 5. In the first embodiment, the identifier of a task 330 illustrated in FIG. 3, which is to provide the information to the user application 810 of the mobile terminal 8, is stored as the subscriber 232, but as described later, a relationship between the task and the mobile terminal 8 of a distribution destination is held by the data processing server 3.

When receiving an update request for an importance level relating to a topic (data) from the publishing module 510 of the data source server 5, the importance level proxy request module 210 queries the publish-subscribe message hub module 220 about the subscriber 232 to each of the topics 231, and in order to update settings of the importance levels for all the subscribers 232 obtained through the query, transmits the update request for the importance levels for the subscribers 232 to a task scheduler module 310 of the data processing server 3.

Subsequently, when the publish-subscribe message hub server 2 receives an update request including addition or deletion of a topic from the publishing module 510 of the data source server 5, the topic setting changing module 240 of the publish-subscribe message hub module 220 updates settings of the subscriber management information 230 shown in FIG. 7.

When receiving a request for subscription to the topic 231 or a request to cancel the subscription from the task on the data processing server 3, the subscriber setting changing module 250 updates the information on the subscriber 232.

When receiving the query request about the subscriber 232 to the topic 231 from the importance level proxy request module 210 or the data distribution module 270, the subscriber identification module 260 refers to the subscriber management information 230 to identify the subscriber 232 to the topic 231 designated by the query request, and returns the relevant subscriber 232 as a response. When receiving, for example, a query request about the subscriber to "topic 1", the subscriber identification module 260 identifies the subscriber 232 from the subscriber management information 230 shown in FIG. 7, and returns "task 1" and "task 4" as a response.

The data distribution module 270 temporarily accumulates, in the memory 22 or the storage unit 25, data transmitted from the publishing module 510 of the data source server 5 for the topic 231 set in the subscriber management information 230, queries the subscriber identification module 260 about the subscriber 232 to the topic 231, and distributes the temporarily accumulated data to the relevant subscriber 232.

As described above, in the publish-subscribe message hub server 2, the importance level proxy request module 210 transmits the update request for the importance level from the data source server 5 to the data processing server 3, and causes the data processing server 3 to execute importance level update. In addition, the publish-subscribe message hub module 220 manages the subscriber management information 230 and distributes the data received from the data source server 5.

<Data Processing Server>

Figure 3:
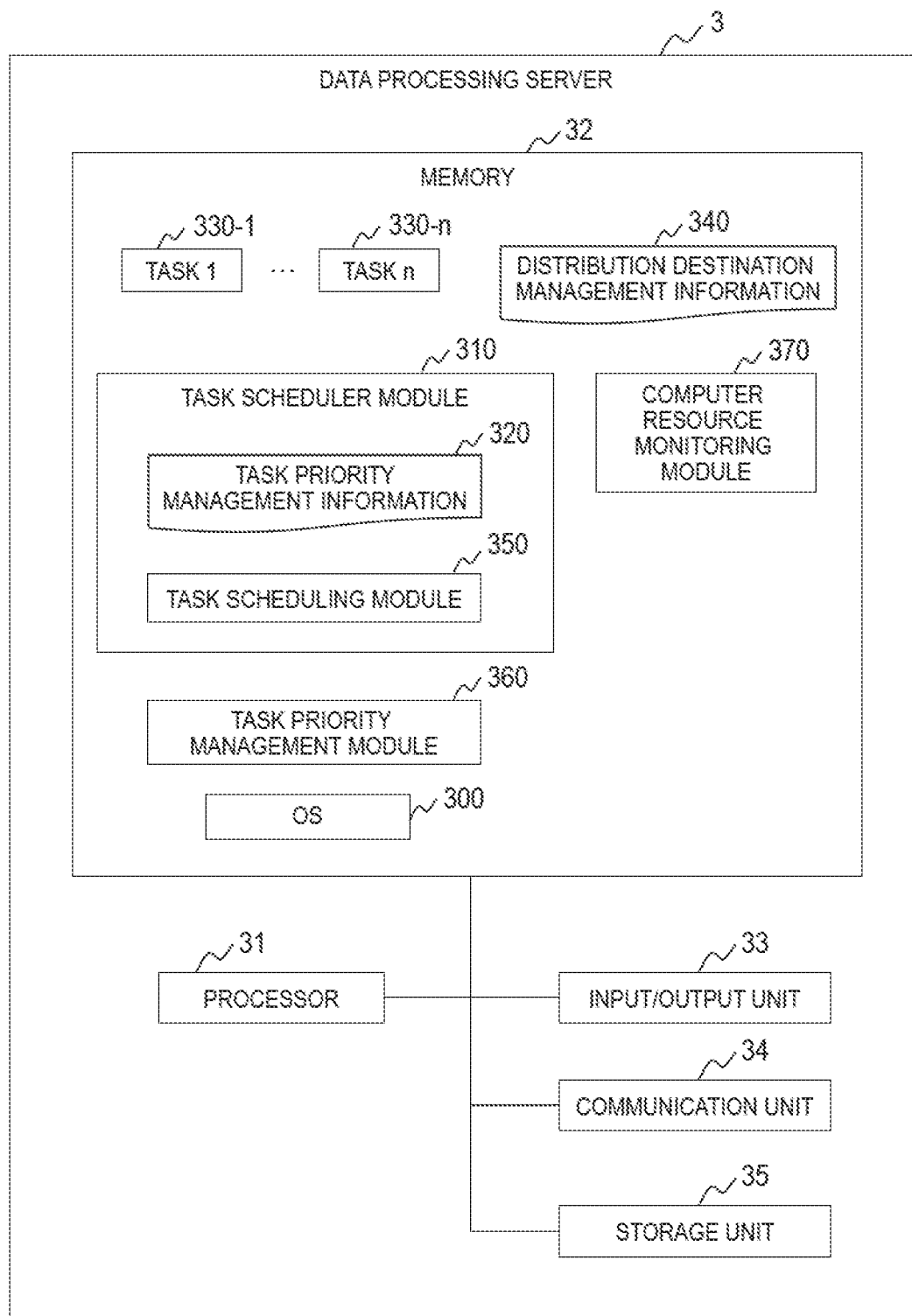
FIG. 3 is a block diagram for illustrating an example of a configuration of the data processing server according to the first embodiment of this invention.

FIG. 3 is a block diagram for illustrating an example of a configuration of the data processing server 3. The data processing server 3 includes a processor 31 configured to execute a program, a nonvolatile storage unit 35 configured to store programs and data, a communication unit 34 configured to perform communication to/from another apparatus, an input/output unit 33 configured to, for example, receive input from the administrator and perform screen display, and a memory 32 configured to temporarily hold data and programs.

An OS 300, the task scheduler module 310, a task priority management module 360, tasks 330-1 to 330-n, distribution destination management information 340, and a computer resource monitoring module 370 are loaded into the memory 32 to be executed by the processor 31. The task scheduler module 310, the task priority management module 360, the tasks 330-1 to 330-n, and the computer resource monitoring module 370 are operated on the OS 300.

The processor 31 operates as a functional module configured to provide a predetermined function by performing processing in accordance with a program of each functional module. For example, the processor 31 functions as the task priority management module 360 by performing processing in accordance with a task priority management program. The same applies to other programs. In addition, the processor 31 also operates as a functional module configured to provide each function of a plurality of processing steps executed by each program. A computer and a computer system therefor are an apparatus and a system that include those functional modules.

Information including programs for implementing respective functions of the task scheduler module 310, the task priority management module 360, the tasks 330-1 to 330-n, and the computer resource monitoring module 370 and tables therefor can be stored in the storage unit 35, a nonvolatile semiconductor memory, a hard disk drive, a solid-state drive (SSD), or other such memory device, or an IC card, an SD card, a DVD, or other such computer-readable non-transitory data storage medium.

The task scheduler module 310 includes task priority management information 320 and a task scheduling module 350.

The tasks 330-1 to 330-n subscribe topics (data) received from the publish-subscribe message hub server 2 by publish-subscribe message distribution, thereby assigning various tasks (analysis tasks) to each of the topic, and each distribute the task to the user application 810 of the mobile terminal 8 after executing predetermined processing on the task. A relationship between the task 330 and the mobile terminal 8 of the distribution destination is managed by the distribution destination management information 340.

The task 330 includes processing for providing information to the user application 810 of the mobile terminal 8. Specifically, the user application 810 or the mobile terminal 8 subscribes the topic (data) designated by the task 330, and distributes to the mobile terminal 8 a processing result obtained by performing processing designated for the data.

The task 330 functions as a proxy for the subscriber to the publish-subscribe message hub server 2 on the data processing server 3, and the processing result of the task 330 is used by the user application 810 of the mobile terminal 8, which is an actual subscriber thereto.

As shown in FIG. 9, the distribution destination management information 340 includes, in one entry, a task 341 for storing the identifier of the task 330 and a distribution destination 342 for storing a name of the distribution destination. When the task 330 is initiated, the distribution destination management information 340 registers the distribution destination set in advance in the distribution destination management information 340. In the example shown in FIG. 9, an example in which one distribution destination is assigned to one task 341 is shown, but this invention is not limited thereto, and a plurality of distribution destinations can be assigned to one task 341.

Each task 330 functions as a subscriber configured to subscribe the topic 231 set on the publish-subscribe message hub server 2, and to perform predetermined processing on the data distributed from the publish-subscribe message hub server 2.

The task 330 serving as the subscriber starts the predetermined processing, for example, in an event-driven manner. When receiving the data from the publish-subscribe message hub server 2, the task 330 performs predetermined own processing, and determines an interest level for the relevant topic based on a result of the processing. When there is a change in the interest level, the task 330 notifies the task scheduler module 310 of the update request for the interest level. The interest level represents a current priority of the subscribed topic 231, which is set by the task 330.

The task scheduler module 310 sets a priority for the task 330 based on the task priority management information 320, and protects execution of the important task 330 from another task. The task priority management module 360 manages the task priority management information 320 based on a request received from the data source server 5 and a request received from the task 330.

The computer resource monitoring module 370 acquires use states of computer resources of the data processing server 3 from the OS 300, and monitors the use states. When determining that there is a shortage of computer resources, the computer resource monitoring module 370 instructs the task scheduling module 350 of the task scheduler module 310 to perform priority scheduling, which is described later. When there is a shortage of computer resources, the computer resource monitoring module 370 instructs the task scheduling module 350 to perform normal scheduling, which is described later.

A publicly-known or well-known technology can be used as a method of monitoring the computer resources and a method of determining whether there is a shortage of computer resources. For example, the computer resources to be monitored and indices therefor include a load on the processor 31, a usage rate of the memory 32, and a processor occupancy rate of a process. As the method of determining whether there is a shortage of computer resources, it is possible to use a comparison between a threshold value set in advance for each of the indices and an operating state.

FIG. 8 is a table for showing an example of the task priority management information 320. The task priority management information 320 includes, in one entry, a task 321 for storing the identifier of the task 330 on the data processing server 3, a default priority 322 for storing the priority assumed by a subscriber who uses the mobile terminal 8, an importance level 323 for storing the priority set by the data source server 5, an interest level 324 for storing the current priority assumed by the subscriber who uses the mobile terminal 8, and a final priority 325 for storing a total sum of the respective priorities.

The default priority 322 is a reference value to be used when the final priority 325 for the task 330 is determined in consideration of the importance level 323 and the interest level 324, which are variable elements. The default priority 322 is an initial value of the priority assumed by the subscriber, which is set in advance by the data processing server 3.

The importance level 323 is a priority set by the data source server 5, and is changed based on, for example, environmental changes relating to distribution contents. The importance level 323 represents a priority to be used when the subscriber (task 330 or mobile terminal 8) uses or processes the topic.

The interest level 324 is a variable value aiming at allowing the task 330 to dynamically change the final priority 325 for the relevant task 330. For example, the task 330 can receive a state of the mobile terminal 8 to change the interest level for the topic 231 depending on the state of the mobile terminal 8. For example, in a case where there is a correlation between the topic 231 and positional information on the mobile terminal 8, the task 330 can control the final priority 325 by increasing the interest level when the positional information on the mobile terminal 8 satisfies a predetermined condition, and otherwise decreasing the interest level.

In this manner, the task priority management information 320 is used to manage, for each task 330, the final priority 325 based on the importance level 323 set by the data source server 5 on the publishing side and the default priority 322 set in advance by the mobile terminal 8 (or task 330) on the subscription side. In this manner, it is possible to control an execution environment of the task 330 based on a request for the priority received from the publishing side and a request for the priority received from the subscription side.

In addition, the interest level 324, which is variably set based on determination of the subscriber (task 330) that uses the data from, for example, its own environmental changes, is added to the task priority management information 320, to thereby be able to dynamically update the final priority 325 depending on a state of the task 330.

When receiving the update request for the importance level from the importance level proxy request module 210 of the publish-subscribe message hub server 2, the task priority management module 360 sets the importance level 323 for the designated task 330 to a designated value to update the task priority management information 320.

Further, when receiving the update request for the interest level from the task 330, the task priority management module 360 sets the interest level 324 for the designated task 330 to a designated value to update the task priority management information 320.

After updating the task priority management information 320, the task priority management module 360 executes the update of the final priority 325.

As the final priority 325, for example, a value obtained by adding the default priority 322, the importance level 323, and the interest level 324 by the task priority management module 360 is used. The calculation of the final priority 325 is not limited thereto, and it is possible to appropriately employ a publicly-known or well-known method, for example, a method of adding the default priority 322, the importance level 323, and the interest level 324 after multiplying each of the values by a weighting coefficient.

The task scheduling module 350 controls the allocation of computer resources to each task 330 in response to a request received from the computer resource monitoring module 370. When the computer resource monitoring module 370 requests the priority scheduling, the task scheduling module 350 refers to the final priority 325 for each task 330 to schedule, for example, an allocation time of the processor 31 and the number of requests received per unit time, so that more computer resources are allocated to the task 330 having a higher final priority 325.

Meanwhile, when the computer resource monitoring module 370 requests the normal scheduling, the task scheduling module 350 performs the allocation of computer resources that does not involve consideration of the final priority 325. The task scheduling module 350 schedules the allocation of computer resources, for example, by a round-robin method. A publicly-known or well-known method may be used for the allocation of computer resources in association with the final priority 325, and hence a description thereof is omitted here.

The above description is directed to an example in which the task scheduler module 310 switches a type of scheduling in response to an instruction received from the computer resource monitoring module 370, but the task scheduler module 310 may constantly employ the priority scheduling.

In addition, in the first embodiment, when computer resources to be allocated to each task 330 are determined, the task scheduling module 350 executes the above-mentioned allocation.

Figure 10:
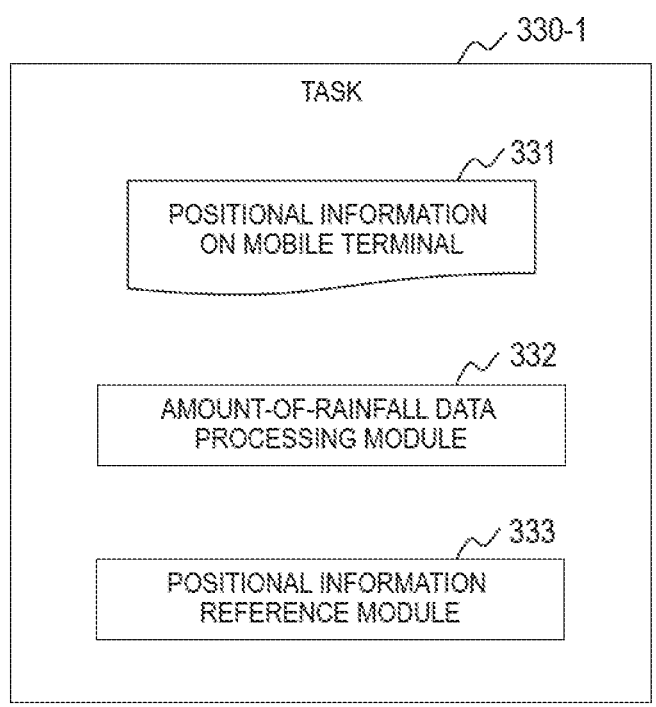
FIG. 10 is a diagram for illustrating an example of a configuration of the task according to the first embodiment of this invention.

FIG. 10 is a diagram for illustrating an example of a configuration of the task 330-1. The first embodiment is directed to an example in which the task 330-1 updates the interest level depending on a state of processing. In the example illustrated in FIG. 10, the task 330-1 updates the interest level based on the relationship between the subscribed data and the positional information on the mobile terminal 8 of the distribution destination.

The task 330-1 includes positional information 331 for storing the positional information on the mobile terminal 8, an amount-of-rainfall data processing module 332 configured to process subscribed data (amount-of-rainfall data), and a positional information reference module 333 configured to refer to the positional information on the mobile terminal 8 from the positional information 331.

The amount-of-rainfall data processing module 332 executes predetermined processing on the amount-of-rainfall data received from the publish-subscribe message hub server 2 to generate a processing result. The amount-of-rainfall data processing module 332 refers to the distribution destination management information 340 to transmit the processing result to the mobile terminal 8-1 of the distribution destination and the data storage server 4. When receiving the positional information from the mobile terminal 8-1, the task 330-1 stores the positional information in the positional information 331.

When referring to the positional information 331 to determine that the mobile terminal 8-1 is located in the vicinity of a downstream area of a river, the task 330-1 determines that the amount-of-rainfall data is important to the mobile terminal 8-1. Then, the task 330-1 adds a predetermined value of "1" to the interest level, and requests the task priority management module 360 to update the interest level. When receiving the update request for the interest level, the task priority management module 360 updates the interest level 324 for the designated task to increase the final priority 325.

In contrast, when determining that the mobile terminal 8-1 is not located in the vicinity of the downstream area of the river, the task 330-1 determines that the amount-of-rainfall data is not important to the mobile terminal 8-1. Then, the task 330-1 subtracts the predetermined value of "1" from the interest level, and requests the task priority management module 360 to update the interest level. When receiving the update request for the interest level, the task priority management module 360 updates the interest level 324 for the designated task to decrease the final priority 325.

In the above-mentioned manner, each task 330 can dynamically change the priority of allocating computer resources to the relevant task 330, by the interest level 324 depending on the state of the processing.

As described above, the data processing server 3 processes the data distributed from the publish-subscribe message hub server 2 by the task 330 serving as the subscriber, and transmits the processed data to the mobile terminal 8. When there is a shortage of computer resources, the task scheduling module 350 can allocate to each task 330 the computer resources corresponding to the value of the final priority 325, which is obtained by taking the default priority 322 and the importance level 323 into consideration.

In addition, the task scheduling module 350 can dynamically change the final priority 325 for each task 330 by changing the interest level 324 depending on, for example, the contents of the subscribed topic 231 and the state of the mobile terminal 8 that uses the processing result of the task 330.

<Data Source Server>

Figure 4:
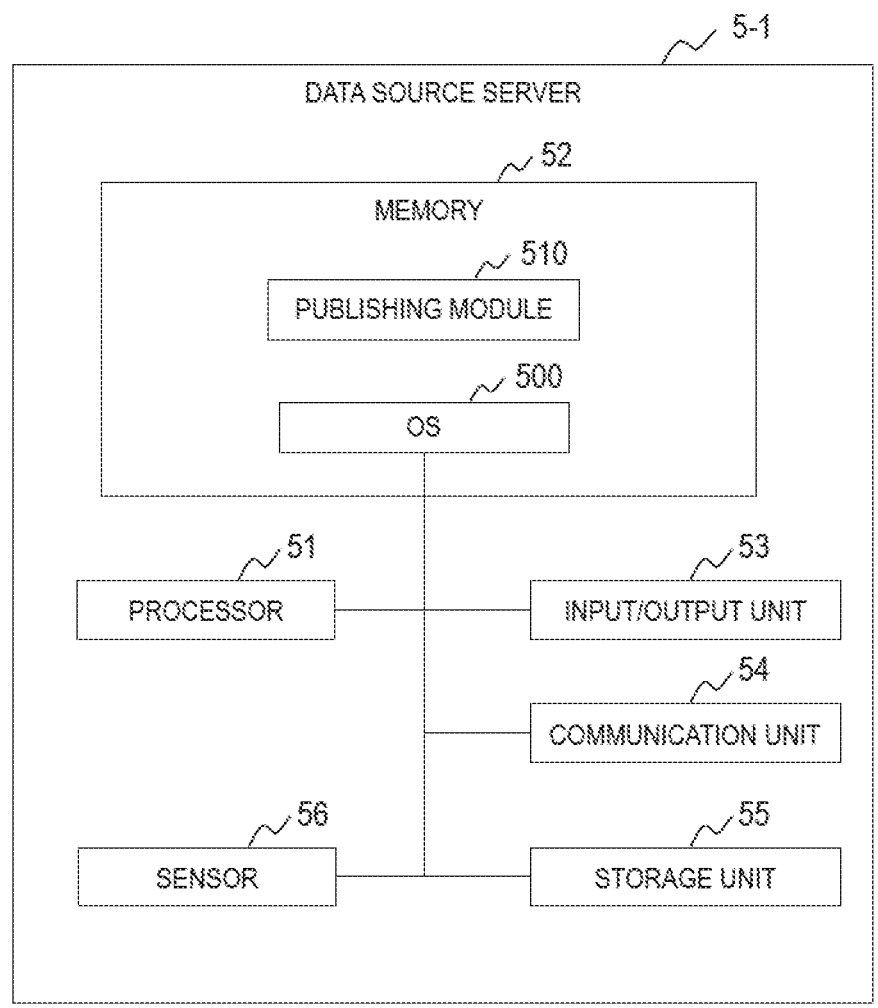
FIG. 4 is a block diagram for illustrating an example of a configuration of the data source server according to the first embodiment of this invention.

FIG. 4 is a block diagram for illustrating an example of a configuration of the data source server 5-1. The data source servers 5-2 and 5-3 have the same configuration, and hence duplicate descriptions thereof are omitted.

The data source server 5 includes a processor 51 configured to execute a program, a nonvolatile storage unit 55 configured to store a program and data, a communication unit 54 configured to perform communication to/from another apparatus, an input/output unit 53 configured to, for example, receive input from the administrator and perform screen display, a memory 52 configured to temporarily hold data and programs, and a sensor 56 configured to detect environmental information including a position and an amount of rainfall.

An OS 500 and the publishing module 510-1 are loaded into the memory 52 to be executed by the processor 31. The publishing module 510-1 is operated on the OS 500.

The processor 51 operates as a functional module configured to provide a predetermined function by performing processing in accordance with a program of each functional module. For example, the processor 51 functions as the publishing module 510-1 by performing processing in accordance with a publishing program. The same applies to other programs. In addition, the processor 51 also operates as a functional module configured to provide each function of a plurality of processing steps executed by each program. A computer and a computer system therefor are an apparatus and a system that include those functional modules.

The following description is made by taking an example in which the sensor 56 is formed of, for example, a sensor for detecting an amount of rainfall, and the task 330 that subscribes data provided by the publishing module 510-1 is configured to detect the amount of rainfall to measure the amount of rainfall in an upstream area of a river and monitor the amount of rainfall.

In a case of an amount-of-rainfall monitoring system set on, for example, the river, the publishing module 510 determines that there is an increase in the importance level when the amount of rainfall in the upstream area of the river exceeds a predetermined threshold value. Then, in order to increase the importance level for the subscriber subscribing the topic, the publishing module 510 requests the importance level proxy request module 210 of the publish-subscribe message hub server 2 to change the setting of the importance level 323.

In contrast, when the amount of rainfall in the upstream area of the river becomes equal to or smaller than the predetermined threshold value, the publishing module 510 determines that there is a decrease in the importance level. Then, in order to decrease the importance level for the subscriber subscribing the topic, the publishing module 510 requests the importance level proxy request module 210 of the publish-subscribe message hub server 2 to change the setting of the importance level 323.

In the above-mentioned manner, the data source server 5 can dynamically change the importance level 323 depending on the determination of the publishing module 510.

<Data Storage Server>

Figure 5:
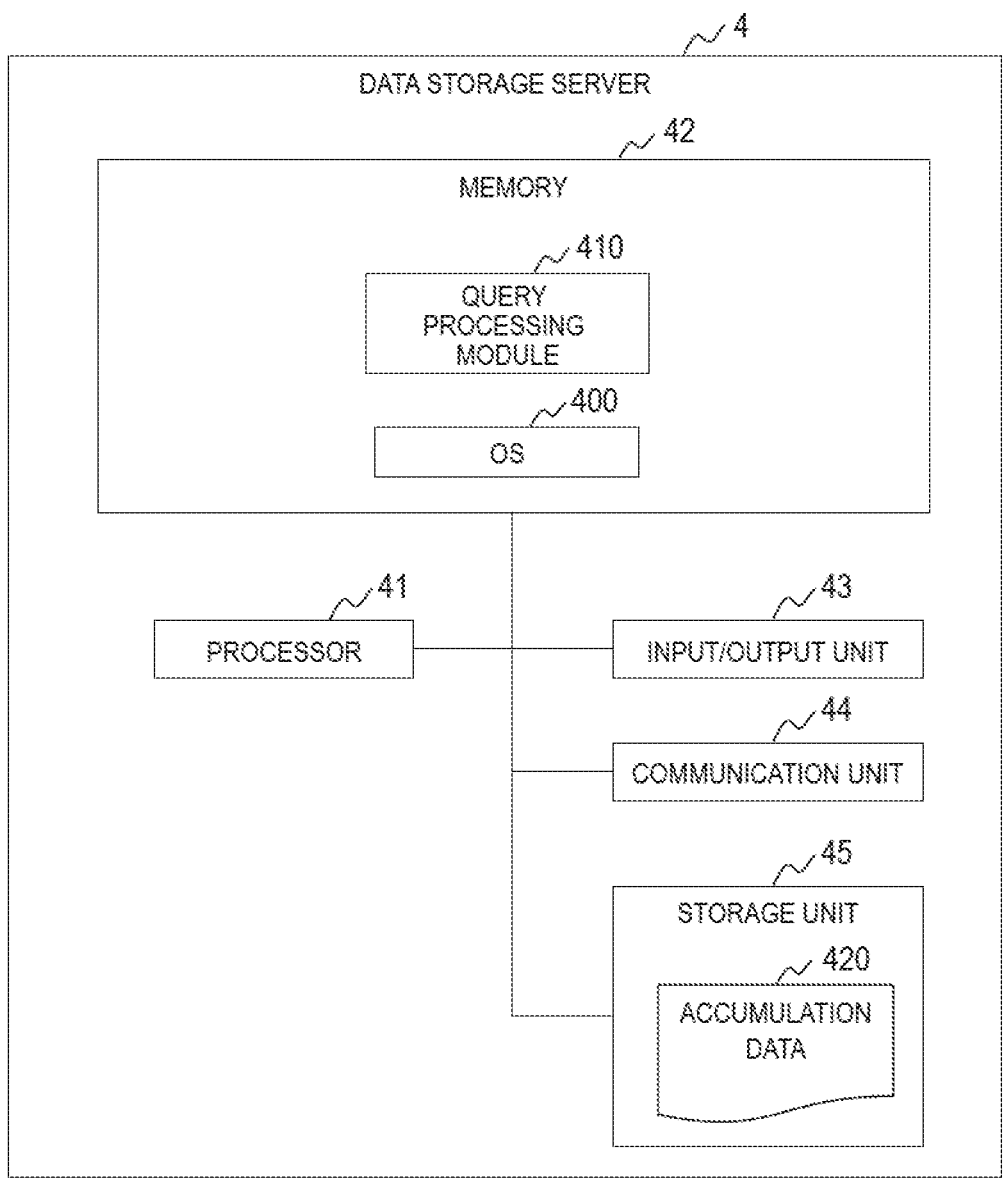
FIG. 5 is a block diagram for illustrating an example of a configuration of the data storage server according to the first embodiment of this invention.

FIG. 5 is a block diagram for illustrating an example of a configuration of the data storage server 4. The data storage server 4 includes a processor 41 configured to execute a program, a nonvolatile storage unit 45 configured to store a program and data, a communication unit 44 configured to perform communication to/from another apparatus, an input/output unit 43 configured to receive, for example, input from the administrator and perform screen display, and a memory 42 configured to temporarily hold data and programs. The storage unit 45 includes accumulation data 420, which is obtained by accumulating the received data. An OS 400 and a query processing module 410 are loaded into the memory 42 to be executed by the processor 41. The query processing module 410 is operated on the OS 400.

The data storage server 4 receives processed data transmitted from the data processing server 3, and stores the received data in the accumulation data 420.

<Mobile Terminal>

Figure 6:
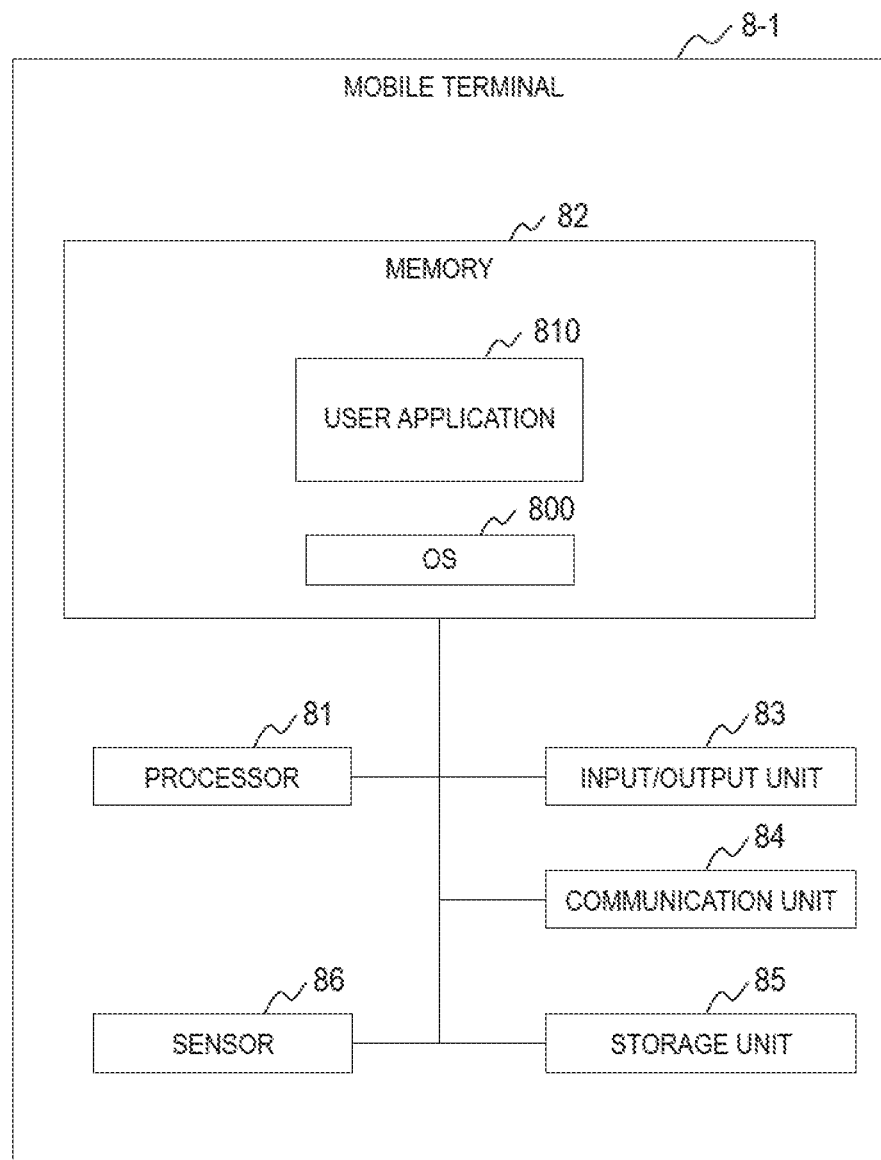
FIG. 6 is a block diagram for illustrating an example of a configuration of the mobile terminal according to the first embodiment of this invention.

FIG. 6 is a block diagram for illustrating an example of a configuration of the mobile terminal 8. The mobile terminal 8 includes a processor 81 configured to execute a program, a nonvolatile storage unit 85 configured to store a program and data, a communication unit 84 configured to perform communication to/from another apparatus, an input/output unit 83 configured to, for example, receive input from the administrator and perform screen display, a memory 82 configured to temporarily hold data and programs, and a sensor 86 configured to detect positional information.

An OS 800 and the user application 810 are loaded into the memory 82 to be executed by the processor 81. The user application 810 is operated on the OS 800. The user application 810 of the mobile terminal 8 receives the processed data transmitted from the data processing server 3, and displays the received data on, for example, a display of the input/output unit 83. The user application 810 also transmits the positional information on the mobile terminal 8 to the data processing server 3.

<Processing>

Figure 11:
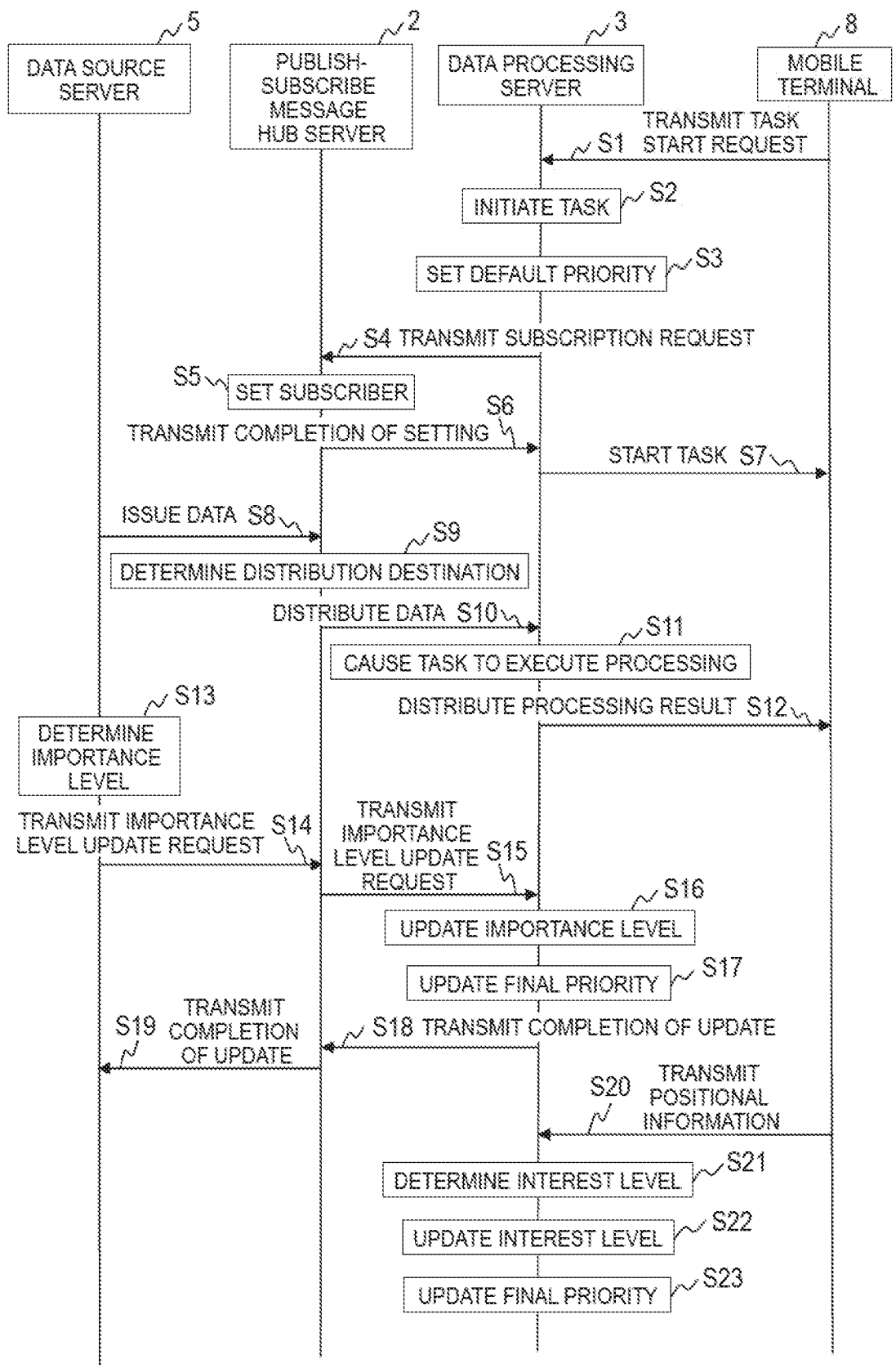
FIG. 11 is a sequence diagram for illustrating an example of processing to be performed by the data processing system according to the first embodiment of this invention.

FIG. 11 is a sequence diagram for illustrating an example of processing to be performed by the data processing system. First, in order to use data provided by the data source server 5, the user application 810 of the mobile terminal 8 transmits a task start request to the data processing server 3 (Step S1). The task start request may contain a topic (data) to be subscribed, a type of the task 330, and the value of the default priority 322.

In response to the task start request, the data processing server 3 initiates the task 330 to determine a topic to be subscribed (Step S2), sets the default priority being the initial value of the priority for the relevant task 330, and adds an entry to the task priority management information 320 (Step S3). The data processing server 3 sets the task 321 and the default priority 322 in the task priority management information 320.

The topic to be subscribed by the task 330 and the default priority 322 may be designated by the mobile terminal 8 as described above, but this invention is not limited thereto, and the topic to be subscribed and the default priority 322 may be set in advance depending on the task 330 selected by the mobile terminal 8.

The data processing server 3 notifies the publish-subscribe message hub server 2 of a request for subscription to a topic to be subscribed by the newly initiated task 330 (Step S4). When receiving the request for the subscription from the data processing server 3, the publish-subscribe message hub server 2 registers the topic 231 and the subscriber 232 in the subscriber management information 230 (Step S5).

Then, the publish-subscribe message hub server 2 transmits, to the data processing server 3, a notification of completion of the registration of the topic 231 (Step S6). When receiving the notification of the completion of the setting from the publish-subscribe message hub server 2, the data processing server 3 notifies the mobile terminal 8 to start the task 330 (Step S7).

After the task 330 is started, the subsequent processing of Step S8 to Step S12 is repeatedly executed.

First, the data source server 5 issues a topic (data) (Step S8). When receiving the topic from the data source server 5, the publish-subscribe message hub server 2 refers to the subscriber management information 230 to determine a subscriber (distribution destination) (Step S9), and distributes the data to the task 330 to be the subscriber to the relevant data (Step S10). When distributing the data, the publish-subscribe message hub server 2 can notify the data processing server 3 of information on the subscriber. This invention is not limited thereto, and the publish-subscribe message hub server 2 may notify the data processing server 3 of the contents of the subscriber management information 230 every time the subscriber management information 230 is updated.

The data processing server 3, which has received the data from the publish-subscribe message hub server 2, distributes the received data to the task 330 based on the information on the subscriber notified of by the publish-subscribe message hub server 2, and causes each task 330 to execute predetermined processing (Step S11). Each task 330 transmits a result of processing the distributed data to the mobile terminal 8 set in the distribution destination management information 340 as the distribution destination 342 (Step S12).

Next, an example in which the data source server 5 on the publishing side requests to change the importance level is illustrated as the subsequent processing of Step S13 to Step S19.

First, the data source server 5 determines whether or not the value of the data issued exceeds a predetermined threshold value (Step S13), and when the value exceeds the predetermined threshold value, the data source server 5 transmits an update request to increase the importance level to the publish-subscribe message hub server 2 (Step S14).

When receiving the importance level update request from the data source server 5, the publish-subscribe message hub server 2 causes the importance level proxy request module 210 to identify the subscriber 232 that subscribes the topic 231 issued by the data source server 5. Then, the importance level proxy request module 210 transmits, to the data processing server 3, an update request to increase the importance level for the identified subscriber 232 (Step S15).

When the data processing server 3 receives the importance level update request and a task for the subscriber from the publish-subscribe message hub server 2, the task priority management module 360 updates the importance level 323 corresponding to the designated task in the task priority management information 320 (Step S16). The task priority management module 360 adds a predetermined value of "1" to the importance level in a case of the update request to increase the importance level. Then, the task priority management module 360 recalculates the final priority 325 for the entry of the relevant task 321 to update the final priority 325 (Step S17).

When the value of the data becomes equal to or smaller than the predetermined threshold value after exceeding the predetermined threshold value, the data source server 5 can transmit an update request to decrease the importance level, and perform the same processing as described above.

After the update of the importance level 323 is completed, the data processing server 3 transmits a notification of completion of the update to the publish-subscribe message hub server 2. The publish-subscribe message hub server 2 transmits the received notification of the completion of the update to the data source server 5, to thereby bring importance level update processing to an end (Step S18 and Step S19).

Next, an example in which the task 330 on the subscriber side requests to update the interest level is illustrated as the subsequent processing of Step S20 to Step S23.

The task 330 receives the positional information from the mobile terminal 8 (Step S20). The positional information may be received from the mobile terminal 8 when the processing result is distributed. The task 330 stores the received positional information in the positional information 331 as illustrated in FIG. 10, and determines whether or not the positional information falls within an area (vicinity of downstream area of the river) set in advance (Step S21). When the positional information falls within the area set in advance, the task 330 outputs to the task priority management module 360 an update request to increase the interest level 324.

When receiving the update request for the interest level 324 from the task 330, the task priority management module 360 updates the interest level 324 corresponding to the relevant task (Step S22). The task priority management module 360 adds a predetermined value of "1" to the interest level 324 in a case of the update request to increase the interest level 324. Then, the task priority management module 360 recalculates the final priority 325 for the entry of the relevant task 321 to update the final priority 325 (Step S23), to thereby bring update processing to an end.

When the positional information moves out of a predetermined area, the task 330 can transmit an update request to decrease the interest level 324, and perform the same processing as described above.

The above description is directed to an example in which the task priority management module 360 sets the value by which to increase or decrease the importance level 323, but this invention is not limited thereto, and the data source server 5 configured to determine the increase or decrease in the importance level 323 may determine an increment value (or decrement value) of the importance level 323.

The above description is also directed to an example in which the task priority management module 360 sets the value by which to increase or decrease the interest level 324, but this invention is not limited thereto, and the task 330 configured to determine the increase or decrease in the interest level 324 may determine an increment value (or decrement value) of the interest level 324.

Figure 12:
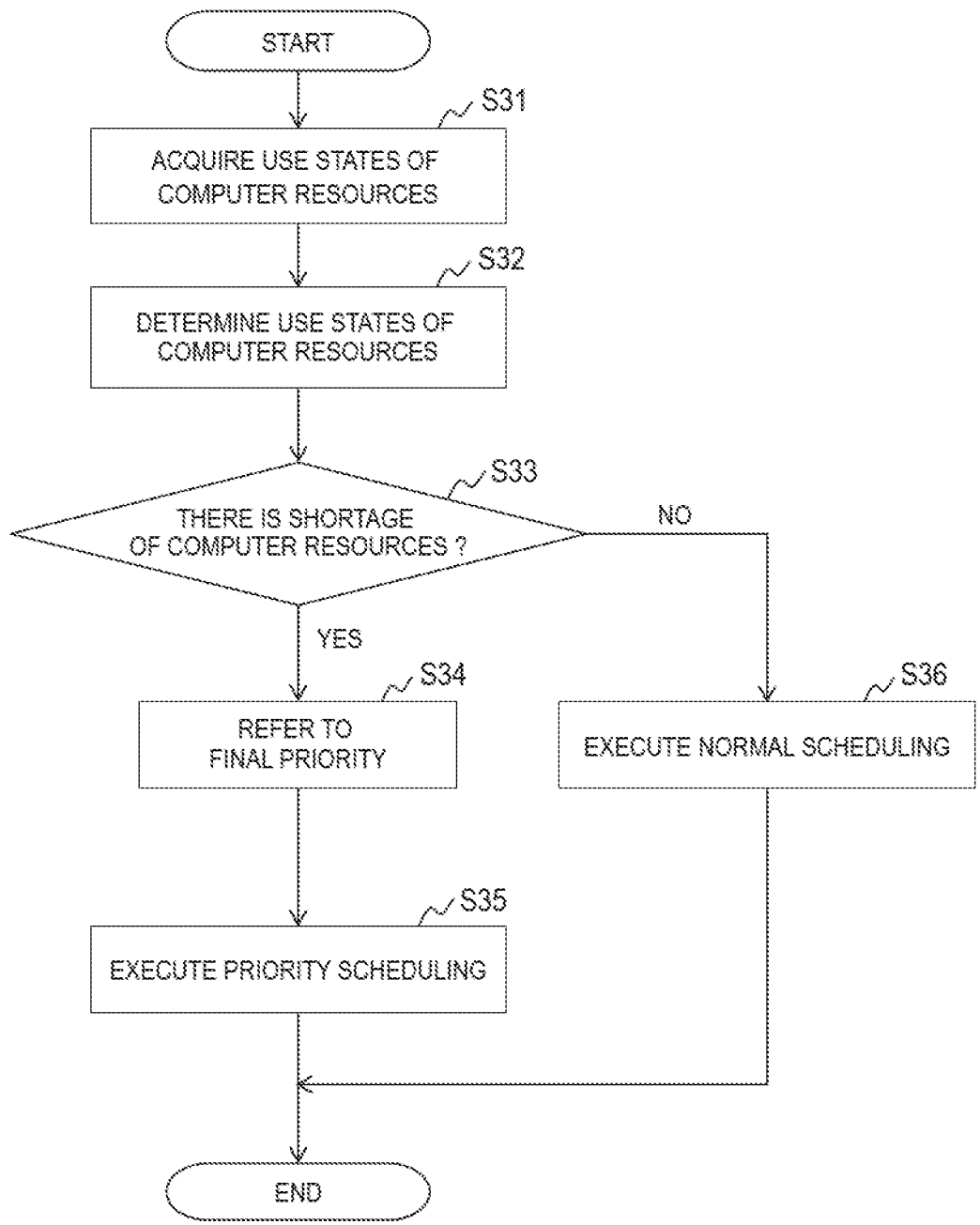
FIG. 12 is a sequence diagram for illustrating an example of processing for allocating resources to the task according to the first embodiment of this invention.

FIG. 12 is a sequence diagram for illustrating an example of processing for allocating resources to the task 330, which is performed by the data processing server 3. This processing is executed at a predetermined cycle period (for example, every minute).

The computer resource monitoring module 370 acquires the use states of computer resources from the OS 300 of the data processing server 3 (Step S31). As the use states of the computer resources, as described above, the usage ratio of the processor 31, the usage ratio of the memory 32, the usage ratio of the communication unit 34, and other such value set in advance are acquired.

The computer resource monitoring module 370 compares respective values of the acquired use state of the computer resources with threshold values set in advance (Step S32), and when there is a value exceeding the threshold value, the computer resource monitoring module 370 determines that there has occurred a shortage of computer resources (Step S33). When there has occurred a shortage of computer resources, the computer resource monitoring module 370 notifies the task scheduler module 310 that there is a shortage of computer resources, and advances to Step S34. Meanwhile, when there has not occurred a shortage of computer resources, the computer resource monitoring module 370 notifies the task scheduler module 310 of the normal scheduling of the computer resources, and advances to Step S36.

In Step S34, the task scheduler module 310, which has received the shortage of computer resources, refers to the final priority 325 of the task priority management information 320. Then, the task scheduler module 310 executes the priority scheduling for determining the computer resources to be allocated to each task 330 depending on the magnitude of the value of the final priority 325 (Step S35).

In Step S36, the task scheduler module 310 that has received the normal scheduling of the computer resources distributes the computer resources to each task 330 by a predetermined method, for example, equal allocation.

With the above-mentioned processing, when the resource shortage occurs, the task scheduler module 310 schedules the computer resources to be allocated to the task 330 based on the final priority 325, to thereby be able to protect an important task 330 from an influence of another task 330 even when there is a shortage of computer resources.

As described above, according to the first embodiment, in addition to the importance level of the data issued by the data source server 5 serving as a publisher of data, the default priority for the mobile terminal 8 on the subscriber can be reflected in a final priority. With this configuration, the data processing server 3 can control the distribution of data with the value of the final priority obtained by taking the priority assumed by the publisher of the data and the priority assumed by the subscriber into consideration.

Then, the default priority 322 set in advance in the task scheduler module 310 relating to the subscriber and the importance level 323 of the topic (data) issued by the publisher of the data, which is dynamically set based on the environmental changes or other such factor, are reflected in the final priority 325. With this configuration, it is possible to allocate computer resources to each task 330 based on the value of the final priority 325 of the data obtained by taking the priority assumed by the publisher and the priority assumed by the subscriber into consideration, which allows both the publisher of the data and the subscriber to flexibly control the allocation of resources.

In addition, the subscriber (task 330) using the data adds the interest level 324 to be dynamically set based on, for example, the subscriber's own environmental change, and reflects the interest level 324 in the final priority 325, to thereby be able to reflect both the priority dynamically set by the publisher of the data and the priority dynamically set by the subscriber in the allocation of computer resources to the task 330.

The first embodiment is described above by taking the example of operating the publish-subscribe message hub server 2 and the data processing server 3 on different computers, but may be operated on the same computer (server). In this case, a server (combination of the publish-subscribe message hub server 2 and the data processing server 3) configured to distribute the data issued by the data source server 5 on the publishing side to the mobile terminal 8 on the subscription side receives the importance level as the priority of the data from the publishing side, receives the default priority 322 from the mobile terminal 8 on the subscription side, calculates the final priority from the importance level and the default priority, and control the resources for the task 330 based on the final priority.

Second Embodiment

The first embodiment is described by taking an example of data distribution of a push type in which the publish-subscribe message hub module 220 transmits data to the subscriber, while a second embodiment of this invention is described by taking an example of data distribution of a pull type in which the task 330 serving as the subscriber requests the publish-subscribe message hub module 220 to transmit data to the task 330.

In the second embodiment, when the data source server 5 issues data, the publish-subscribe message hub server 2 holds the received data until all the subscribers acquire the data.

Figure 13:
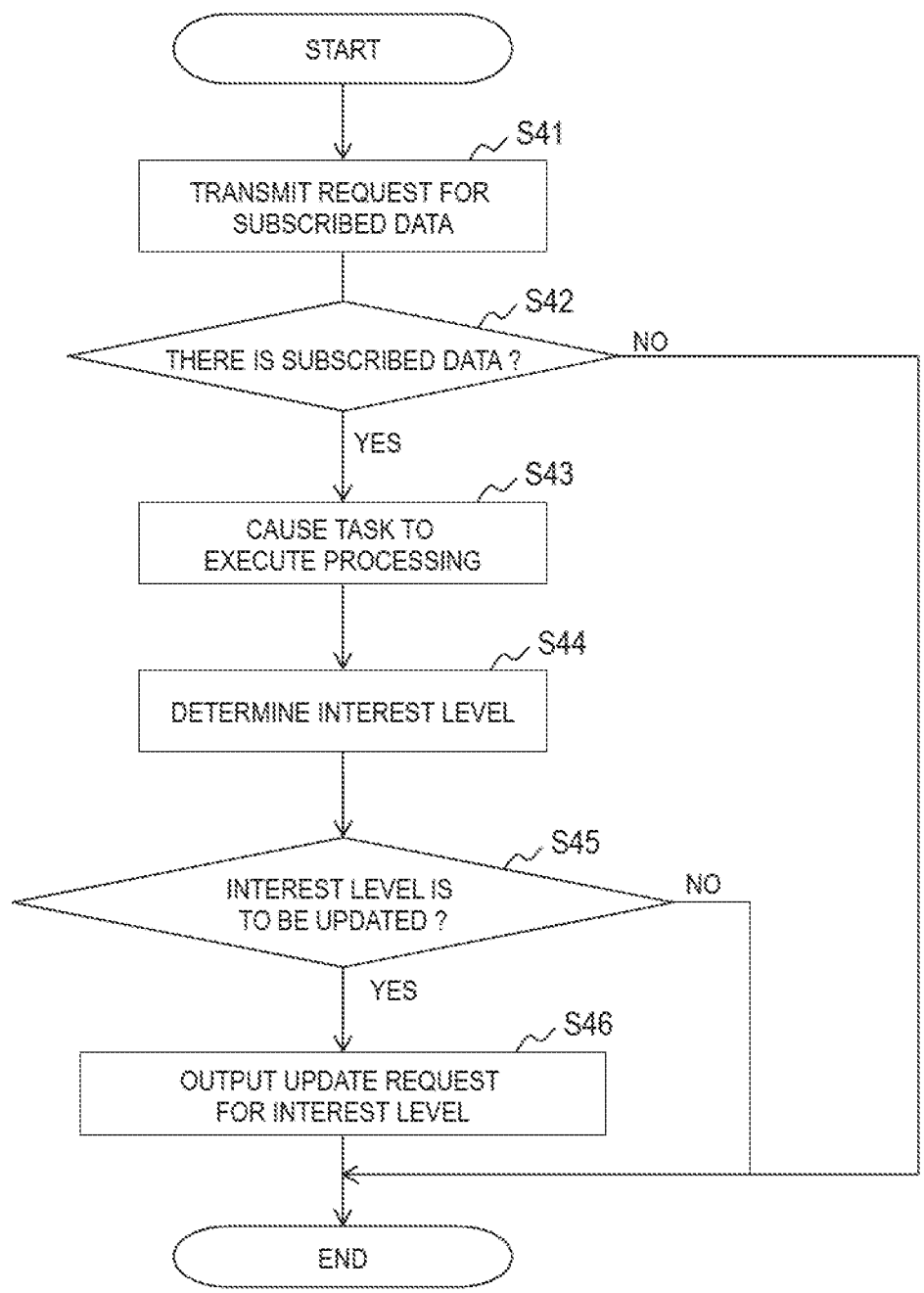
FIG. 13 is a flow chart for illustrating an example of processing to be performed by the task 330 in the second embodiment according to a second embodiment of this invention.

FIG. 13 is a flow chart for illustrating an example of processing to be performed by the task 330 in the second embodiment. This processing is executed at a predetermined cycle period (for example, every minute).

The task 330 transmits a request for the subscribed data to the publish-subscribe message hub server 2 (Step S41). When the data subscribed by the relevant task 330 has been issued, the publish-subscribe message hub server 2 distributes the data to the task 330 on the data processing server 3.

The task 330 on the data processing server 3 determines whether or not the subscribed data has been acquired (Step S42). When the data has been acquired, the task 330 advances to Step S43, and otherwise brings the processing to an end.

In Step S43, the task 330 executes predetermined processing on the acquired data, and transmits a result of the processing to the mobile terminal 8 of the distribution destination and the data storage server 4. In Step S44, the task 330 acquires the positional information from the mobile terminal 8, and in the same manner as in Step S21 of FIG. 11, determines whether or not the positional information falls within an area set in advance.

Subsequently, in Step S45, the task 330 determines whether or not to update the interest level 324. When the interest level 324 is to be updated, the task 330 advances to Step S46, and otherwise brings the processing to an end. In Step S46, the task 330 transmits the update request for the interest level 324 to the task priority management module 360, to thereby bring the processing to an end.

As described above, even when the publish-subscribe message hub server 2 is of a pull type, the data processing server 3 can process a topic (data) issued by the data source server 5 to distribute the topic to the mobile terminal 8 in the same manner as in the first embodiment.

Third Embodiment

In the first embodiment or the second embodiment, the publishing module 510 updates the importance level for the task 330 serving as the subscriber through intermediation of the importance level proxy request module 210, while a third embodiment of this invention is described by taking an example of updating the importance level 323 by providing the importance level to the data to be transmitted instead of the intermediation of the importance level proxy request module 210.

The third embodiment does not involve the use of the importance level proxy request module 210 of the publish-subscribe message hub server 2 in the first embodiment. In addition, when the importance level update is required at a time of issuing data, the publishing module 510 of the data source server 5 adds an importance level to the data and distributes the data.

Figure 14:
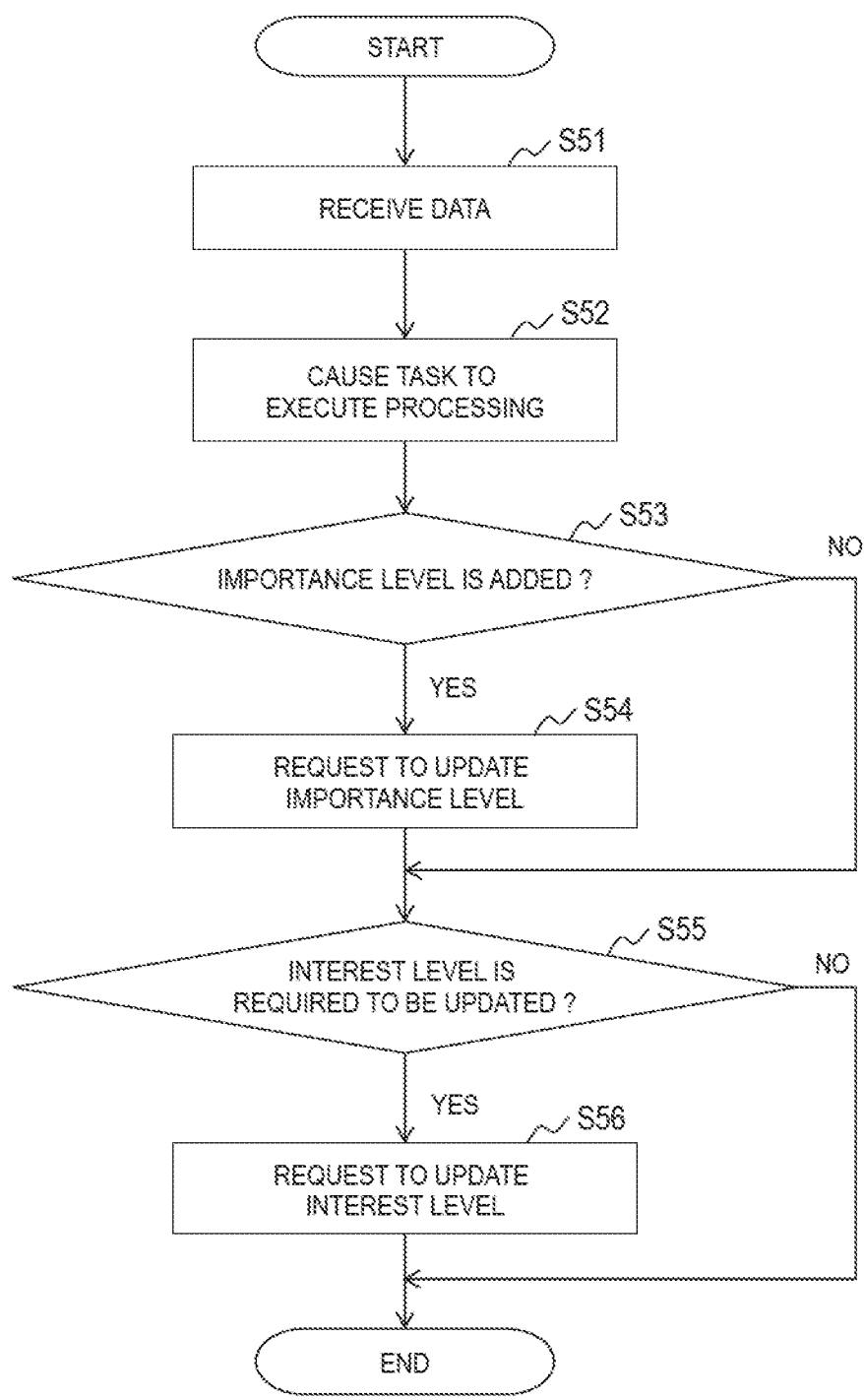
FIG. 14 is a flow chart for illustrating an example of processing to be performed by the task in a third embodiment of this invention.

FIG. 14 is a flow chart for illustrating an example of processing to be performed by the task 330 in the third embodiment. This processing is executed at a predetermined cycle period (for example, every minute).

The task 330 receives data from the publish-subscribe message hub server 2 (Step S51). In the same manner as in the first embodiment, the task 330 executes predetermined processing on the received data, and transmits a result of the processing to the mobile terminal 8 of the distribution destination and the data storage server 4 (Step S52).

Subsequently, in Step S53, the task 330 determines whether or not an importance level is added to the received data. When an importance level is added to the data, the task 330 advances to Step S54, and when an importance level is not added to the data, the task 330 advances to Step S55.

In Step S54, the task 330 acquires the value of the importance level added to the data, and instructs the task priority management module 360 to update the importance level 323 with the designated value.

In Step S55, the task 330 acquires the positional information from the mobile terminal 8, and in the same manner as in Step S21 of FIG. 11, determines whether or not to update the interest level 324. When the interest level 324 is to be updated, the task 330 advances to Step S56, and otherwise brings the processing to an end. In Step S56, the task 330 transmits the update request for the interest level 324 to the task priority management module 360, to thereby bring the processing to an end.

As described above, in the case of adding the importance level to the data when the data source server 5 updates the importance level, without using the importance level proxy request module 210 of the publish-subscribe message hub server 2, which is described in the first embodiment, it is possible to cause the task 330 on the data processing server 3 to receive the importance level added to the data and update the task priority management information 320.

In the third embodiment, the importance level proxy request module 210 is not used, and hence it is possible to use the same apparatus as one that has hitherto been adopted as the publish-subscribe message hub server 2.

<Conclusion>

In the first embodiment, as an example of the data to be processed by the task 330, the example of subscribing the data on the amount of rainfall issued by the data source server 5 is described above, but this invention is not limited thereto, and the data processed by the task 330 may include material qualities, prices, character strings, or other such data.

Further, in the first embodiment, the example in which the data source server 5 issues data is described above, but this invention is not limited thereto, and as a subject configured to issue data, for example, a production apparatus or a transport machine may issue data.

This invention is not limited to the embodiments described above, and encompasses various modification examples. For instance, the embodiments are described in detail for easier understanding of this invention, and this invention is not limited to modes that have all of the described components. Some components of one embodiment can be replaced with components of another embodiment, and components of one embodiment may be added to components of another embodiment. In each embodiment, other components may be added to, deleted from, or replace some components of the embodiment, and the addition, deletion, and the replacement may be applied alone or in combination.

Some of all of the components, functions, processing units, and processing means described above may be implemented by hardware by, for example, designing the components, the functions, and the like as an integrated circuit. The components, functions, and the like described above may also be implemented by software by a processor interpreting and executing programs that implement their respective functions. Programs, tables, files, and other types of information for implementing the functions can be put in a memory, in a storage apparatus such as a hard disk, or a solid state drive (SSD), or on a recording medium such as an IC card, an SD card, or a DVD.

The control lines and information lines described are lines that are deemed necessary for the description of this invention, and not all of control lines and information lines of a product are mentioned. In actuality, it can be considered that almost all components are coupled to one another.

What is claimed is:

1. A priority control method for controlling a priority by a server, the server comprising a processor and a memory and being configured to distribute data issued by a data source to a terminal, the priority control method comprising:
a first step of transmitting to the server, by the terminal, a default priority and data to be subscribed;
a second step of receiving, by the server, the data to be subscribed by the terminal and the default priority of the data, and setting the terminal and the default priority in priority management information in association with each other;
a third step of setting, by the server, the data issued by the data source and the terminal subscribing the data in subscriber management information in association with each other;
a fourth step of transmitting, by the data source, an importance level of the issued data;
a fifth step of setting, by the server, the importance level received from the data source in the priority management information in association with the default priority for the terminal subscribing the data; and
a sixth step of referring, by the server, to the priority management information to calculate a final priority from the default priority for the terminal and the importance level.

2. The priority control method according to claim 1, further comprising:
a seventh step of issuing the data by the data source; and
an eighth step of receiving, by the server, the issued data, and controlling data distribution of the data based on the final priority for the terminal subscribing the data.

3. The priority control method according to claim 1, further comprising executing, by the server, a task of receiving the subscribed data in place of the terminal and distributing to the terminal a processing result obtained by executing predetermined processing on the data,
wherein the second step comprises receiving, by the terminal, the default priority of the subscribed data, and setting the task that is to distribute the processing result to the terminal and the default priority in the priority management information in association with each other,
wherein the third step comprises setting the data issued by the data source and the task that is to distribute the processing result to the terminal in the subscriber management information in association with each other, and
wherein the fifth step comprises setting the importance level received from the data source in the priority management information in association with the default priority for the task subscribing the data.

4. The priority control method according to claim 2, further comprising executing, by the server, a task of receiving the subscribed data in place of the terminal and distributing to the terminal a processing result obtained by executing predetermined processing on the data, and,
wherein the second step comprises receiving, by the terminal, the default priority of the subscribed data, and setting the task that is to distribute the processing result to the terminal and the default priority in the priority management information in association with each other,
wherein the third step comprises setting the data issued by the data source and the task that is to distribute the processing result to the terminal in the subscriber management information in association with each other, and
wherein the fifth step comprises setting the importance level received from the data source in the priority management information in association with the default priority for the task subscribing the data, and
wherein the eighth step comprises receiving the data issued by the data source, and controlling a computer resource to be allocated to the task based on the final priority for the task subscribing the data.

5. The priority control method according to claim 3, wherein the server comprises:
a publish-subscribe message hub configured to receive the data issued by the data source, and distribute the data to the terminal; and
a data processing server configured to transmit, to the terminal, a processing result obtained by processing the data distributed from the publish-subscribe message hub by the task.

6. A data processing system, which is configured to allow a server to control a priority, the data processing system comprising:
a terminal located on a subscription side;
a data source located on a publishing side; and
the server, which comprises a processor and a memory, and is configured to distribute data issued by the data source to the terminal,
wherein the terminal is configured to transmit to the server a default priority and data to be subscribed,
wherein the server
receives the data to be subscribed by the terminal and the default priority of the data;
receives an importance level of the data issued by the data source; and
sets the importance level, the terminal subscribing the data, and the default priority in priority management information in association with one another; and
sets the data issued by the data source and the terminal subscribing the data in subscriber management information in association with each other, and
refers to the priority management information to calculate a final priority from the default priority for the terminal and the importance level.

7. The data processing system according to claim 6,
wherein the data source is configured to issue the data, and
wherein the server receives the data issued by the data source, and control data distribution of the data based on the final priority for the terminal subscribing the data.

8. The data processing system according to claim 6,
wherein the server is configured to execute a task of receiving the subscribed data in place of the terminal and distributing to the terminal a processing result obtained by executing predetermined processing on the data, and
wherein the server
sets the default priority received from the terminal and the task that is to distribute the processing result to the terminal in the priority management information in association with each other; and
sets the importance level received from the data source in the priority management information as the priority for the task subscribing the data in association with the default priority.

9. The data processing system according to claim 7,
wherein the server is configured to execute a task of receiving the subscribed data in place of the terminal and distributing to the terminal a processing result obtained by executing predetermined processing on the data, wherein the server
- sets the default priority received from the terminal and the task that is to distribute the processing result to the terminal in the priority management information in association with each other; and
- sets the importance level received from the data source in the priority management information as the priority for the task subscribing the data in association with the default priority, and controls a computer resource to be allocated to the task based on the final priority for the task subscribing the data.

10. The data processing system according to claim 8,
wherein the server comprises:
- a publish-subscribe message hub configured to receive the data issued by the data source, and distribute the data to a distribution destination; and
- a data processing server configured to transmit, to the terminal, a processing result obtained by processing the data distributed from the publish-subscribe message hub by the task, wherein the publish-subscribe message hub comprises the message hub module, and wherein the data processing server comprises the priority management module.

* * * * *